D. Miffleton,
Grain Cradle.

No. 18,464.　　　　　　　　　Patented Oct. 20, 1857.

UNITED STATES PATENT OFFICE.

DANIEL MIFFLETON, OF KING GEORGE'S COURT-HOUSE, VIRGINIA.

IMPROVEMENT IN GRAIN-CRADLES.

Specification forming part of Letters Patent No. 18,464, dated October 20, 1857.

*To all whom it may concern:*

Be it known that I, DANIEL MIFFLETON, of King George's Court-House, in the county of King George and State of Virginia, have invented certain new and useful Improvements in Grain-Cradles; and I do hereby declare that the following is a full, clear, and exact description of the same, reference being had to the accompanying drawings, in which—

Figure 1:
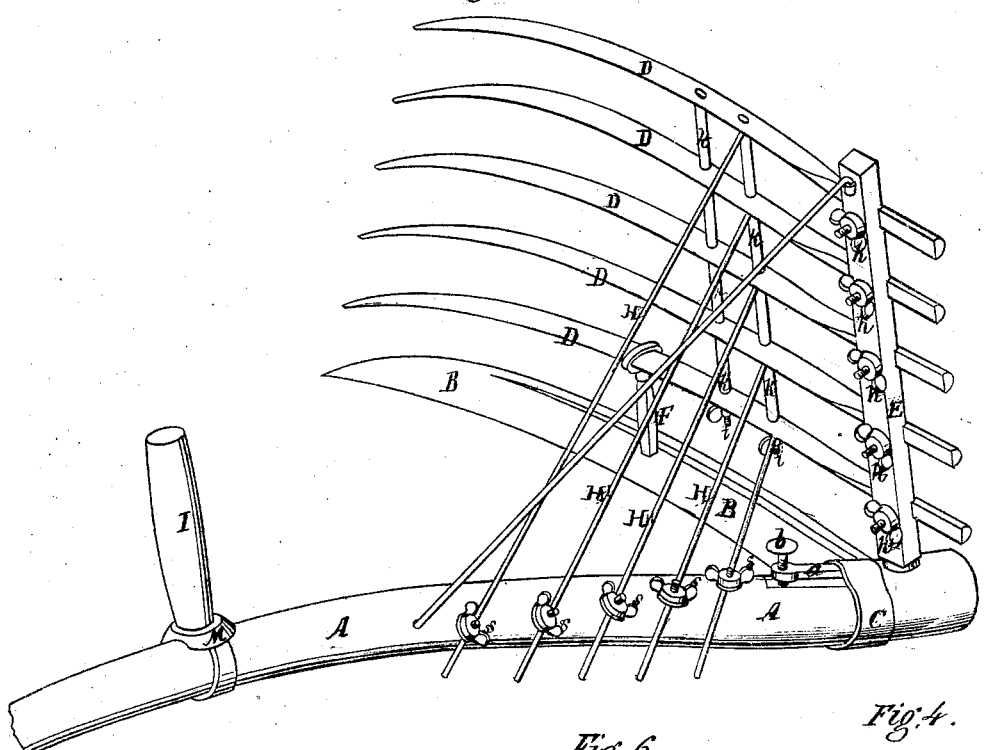

Figure 1 represents a perspective view of said cradle, and Figs. 2, 3, 4, 5, and 6 represent detached views of details hereinafter to be described.

The nature of my invention relates to an improved mode of adjusting the fingers of a grain-cradle.

To enable others skilled in the art to make and use my invention, I will proceed to describe the same with reference to the drawings.

A represents the snath.

Figure 2:
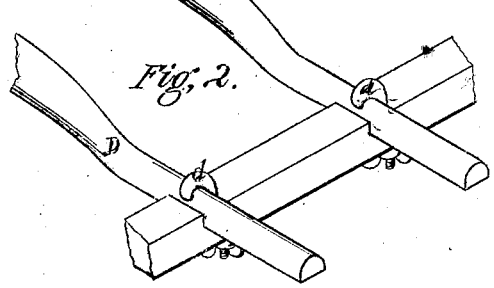
Figure 5:
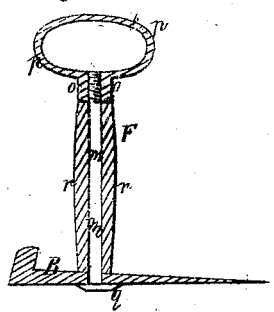
Figure 3:

B represents the scythe, which is attached to the snath by means of ring C and wedge *a*, which latter can be operated so as to secure or release the scythe by turning set-screw *b*. The fingers D are secured to the arm E by means of hook-bolts *d* and clamp-screws *h*, as represented in Figs. 2 and 3. Thus the length of these fingers can be adjusted to scythes of different lengths by sliding the rear ends within the hooks *d*, and when adjusted to the proper position they can be secured by means of screw-nuts *h*. The fingers D are secured and braced to each other by means of screw-bolts *i* passing through tubes *k*, the latter serving to keep the fingers distended in their true position. The lowest finger D is secured to the scythe by means of brace F, represented in detail in Fig. 5.

*m* represents a square rod, which has a screw-thread, *n*, cut at its upper end, working in the screw-nut *o* of the staple *p*.

*r* represents a square tube, which incloses the rod *m*. In applying this brace for securing the lower finger to the scythe the square bolt *m* is passed through a hole in the scythe, leaving its head *g* outside, the staple *p* is passed over the lower finger D, and the upper end of rod *m* is screwed into nut *o* by turning the square tube *r*. The object of this adjustable brace-rod is to operate in conjunction with the adjustments of the fingers D, for when the fingers D are to be lengthened or shortened the bolt *m* is unscrewed, and said fingers can be adjusted without removing the bolt *m* from its hole in the scythe.

Figure 6:
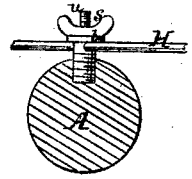
Figure 4:
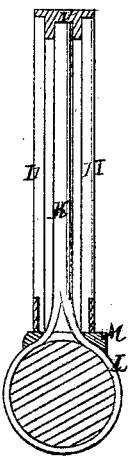

The arm E, to which the fingers are secured, is attached to the snath A in such a manner that it can be slightly turned when the scythe and fingers are spread, and the fingers are retained in their position by means of spreading-rods H, attached to the bolts *i*, which can be adjusted and secured by means of clamp-screw nuts *s*, washer *t*, and clamp-screw *u*, as represented in Fig. 6.

Thus it will be seen that by the arrangements as described the fingers D are susceptible of adjustments in two different directions: First, they can be spread by lengthening or shortening the attachment of spreading-rods H, and then the fingers themselves can be lengthened or shortened to adapt them to scythes of different lengths.

The handle I is secured to the snath in the following manner: The rod K is formed at one end with a ring, L, which is passed over the snath, the handle I consisting of a tube provided at its upper end with a screw-nut, *v*, fitting over the screw on the upper end of rod K. M is a washer, the lower side of which is cut out so as to fit the curvature of the snath by shoving ring L over the snath A and placing washer M down on rod K, and the tube I also over said rod. The latter can be screwed tightly onto rod K, and is thus permanently attached to the snath A.

Having thus fully described the nature of my invention, what I claim therein as new, and desire to secure by Letters Patent, is—

The adjustable fingers D, in combination with the brace F, arranged and operating in the manner and for the purpose set forth.

DANIEL MIFFLETON.

Witnesses:
  E. F. HUNTER,
  J. WESLEY BROWN.